United States Patent
Bae et al.

(10) Patent No.: US 7,379,122 B2
(45) Date of Patent: May 27, 2008

(54) DIGITAL TV AND CHANNEL SETTING METHOD THEREOF

(75) Inventors: Sang Chul Bae, Daegu-si (KR); Su Dong Hong, Gumi-si (KR)

(73) Assignee: LG Electronics, Inc., Seoul (KR)

( * ) Notice: Subject to any disclaimer, the term of this patent is extended or adjusted under 35 U.S.C. 154(b) by 527 days.

(21) Appl. No.: 10/915,329

(22) Filed: Aug. 11, 2004

(65) Prior Publication Data
US 2005/0036073 A1  Feb. 17, 2005

(30) Foreign Application Priority Data
Aug. 11, 2003  (KR)  ........................ 10-2003-0055380

(51) Int. Cl.
*H04N 5/50* (2006.01)
(52) U.S. Cl. ........................ 348/732; 348/731
(58) Field of Classification Search ........ 348/731–733, 348/554–558
See application file for complete search history.

(56) References Cited

U.S. PATENT DOCUMENTS

| | | | | |
|---|---|---|---|---|
| 4,776,038 A | * | 10/1988 | Testin et al. | 455/182.3 |
| 6,137,546 A | * | 10/2000 | Shintani et al. | 348/731 |
| 6,600,522 B1 | * | 7/2003 | Kim | 348/732 |
| 6,734,804 B1 | * | 5/2004 | Lee | 340/825.72 |

FOREIGN PATENT DOCUMENTS

| | | |
|---|---|---|
| CN | 1340242 A | 3/2002 |
| CN | 1150775 C | 5/2004 |

* cited by examiner

*Primary Examiner*—M. Lee
(74) *Attorney, Agent, or Firm*—Birch, Stewart, Kolasch & Birch, LLP

(57) ABSTRACT

An image display apparatus equipped with an analog tuner and a digital tuner includes a key input unit for enabling a user to input an automatic channel scan command and other requests; a controller for conducting channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein the comparison of the number of channels scanned first with a predetermined number of channels determines a channel scan method; and a memory for storing analog channels/ digital channels being automatically scanned.

14 Claims, 4 Drawing Sheets

DIGITAL TV AND CHANNEL SETTING METHOD THEREOF

This Non-provisional application claims priority under 35 U.S.C §119(a) on patent application Ser. No(s). 10-2003-0055380 filed in Korea, Republic of on Aug. 11, 2003, the entire contents of which are hereby incorporated by reference.

BACKGROUND OF THE INVENTION

1. Field of the Invention

The present invention relates in general to an image display apparatus, more particularly, to a digital TV and a channel setting method thereof, wherein digital channel scan is not performed on channel numbers reserved for analog broadcast.

2. Discussion of the Background Art

In general, when an analog broadcast is seen on a big screen TV, image quality is lowered, and the number of allocated channels is limited to 80 including VHF (very high frequency and UHF (ultra high frequency) channel band, so an analog TV has its limit as a single direction medium.

To overcome the problems of the analog broadcast system, a digital broadcast system has been developed. The digital broadcast remarkably improved the image quality of the analog broadcast, offering an image more than twice as clear as the analog broadcast. And, since there is no interference between adjacent channels, the digital television provides full surfing capability, using every channel not used.

Another merit of the digital broadcast is that it can freely transfer, process, provide, and store contents (video, audio, data) without data loss. Thus, a lot of services the analog broadcast system could not provide are now available.

For example, the digital broadcast does not have a ghost that usually occurs as an analog TV signal goes through the air or significant image deterioration in image quality (e.g., bleeding), so that it can provide services with high image quality and high sound quality.

The high image quality refers to clear, crisp images equivalent to 35 mm film images. Generally, a HDTV (High Definition Television) provides such images. On the other hand, a SDTV (Standard Density Television) provides nearly 16 mm film images, yet they are still better than the images in the analog broadcast.

The image gets clearer as the number of pixels, the smallest resolvable rectangular area of an image on a screen, is higher. Normally, the HDTV has resolution of 2 million pixels (resolution: 1920×1080), and the SDTV has resolution of 350,000 pixels (resolution: 720×480). The high sound quality refers to the CD-quality stereo sound quality or 3D surround sound quality of film Considering that 6 speakers are used to produce the 3D surround sound, the digital TV brings viewers stereo, real-time effects that could find in a movie theater only.

Because of these advantages, the digital broadcast system has grown more and more popular. Although the analog broadcast and the digital broadcast will go on the air together by 2010, the digital broadcast will ultimately replace the analog broadcast at the end.

Right now, digital TVs provide automatic channel setup environments to enable viewers to tune into both analog and digital broadcasts at the same time.

That is, after checking the statue of an antenna currently being used to receive TV signals, the digital TV sets the channels in order of over-the-air broadcast/cable broadcast/digital TV air broadcast/digital TV cable broadcast.

FIG. 1 diagrammatically illustrates frequencies of channels currently being used for broadcasting.

As shown in FIG. 1, channels 2-69 are allocated to the over-the-air broadcast TV programs, and channels 1, 14-125 are allocated to the cable broadcasts. Therefore, the digital TV checks a synchronous signal with a channel in a frequency range corresponding to each number. Thus, if a synchronous signal exists in a certain channel, the digital TV remembers the channel, but if not, it does not remember the channel.

Here, the over-the-air broadcasts and the digital TV air broadcasts use the same frequency band, and the cable broadcasts and the digital TV cable broadcasts use the same frequency band.

Therefore, digital broadcasts cannot be sent to the frequency band already being used for analog broadcasts. This means that it is useless to scan digital broadcasts on analog broadcast signals.

Nevertheless, when the automatic channel scanning is set, the related art digital TV scans digital broadcasts even in the frequency band for analog broadcasts. Thus, it takes more time than necessary to set channels.

SUMMARY OF THE INVENTION

An object of the invention is to solve at least the above problems and/or disadvantages and to provide at least the advantages described hereinafter.

Accordingly, one object of the present invention is to solve the foregoing problems by providing a digital TV and a channel setting method thereof, capable of skipping the scan for digital broadcast channels in analog broadcast channels.

Another object of the present invention is to reduce digital broadcast channel setting time by skipping analog broadcast channels existing in the same frequency band with digital broadcast channels.

The foregoing and other objects and advantages are realized by providing an image display apparatus equipped with an analog tuner and a digital tuner, the apparatus including: a key input unit for enabling a user to input an automatic channel scan command and other requests; a controller for conducting channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein the channel scan is skipped on pre-stored channels and only the rest of channels are subject to the scan; and a memory for storing analog channels/digital channels being automatically scanned.

According to another aspect of the invention, an image display apparatus equipped with an analog tuner and a digital tuner includes: a key input unit for enabling a user to input an automatic channel scan command and other requests; a controller for conducting channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein the comparison of the number of channels scanned first with a predetermined number of channels determines a channel scan method; and a memory for storing analog channels/ digital channels being automatically scanned.

According to another aspect of the invention, a channel setting method of a digital TV equipped with an analog tuner and a digital tuner, the method including the steps of: if a user inputs an automatic channel scan command through a key input unit, scanning analog channels or digital channels first and storing the scanned channels; and skipping channel scan on the analog or digital channels already being scanned and stored, and continuing the channel scan for the rest of channels.

According to another aspect of the invention, a channel setting method of a digital TV equipped with an analog tuner and a digital tuner includes the steps of: if a user inputs an automatic channel scan command through a key input unit, scanning analog channels or digital channels and storing the scanned channels; determining a channel scan method based on the comparison result of the number of channels scanned first with a predetermined number of channels; and scanning part of or all analog or digital channels, depending on which channels are first scanned, and storing the scanned channels. If the number of channels scanned first is greater than the predetermined number of channels, part of the channels are scanned; while if the number of channels scanned first is less than the predetermined number of channels, all of the channels are scanned.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a digital TV and a channel setting method thereof according to a preferred embodiment of the invention in reference to the accompanying drawings.

Figure 1:
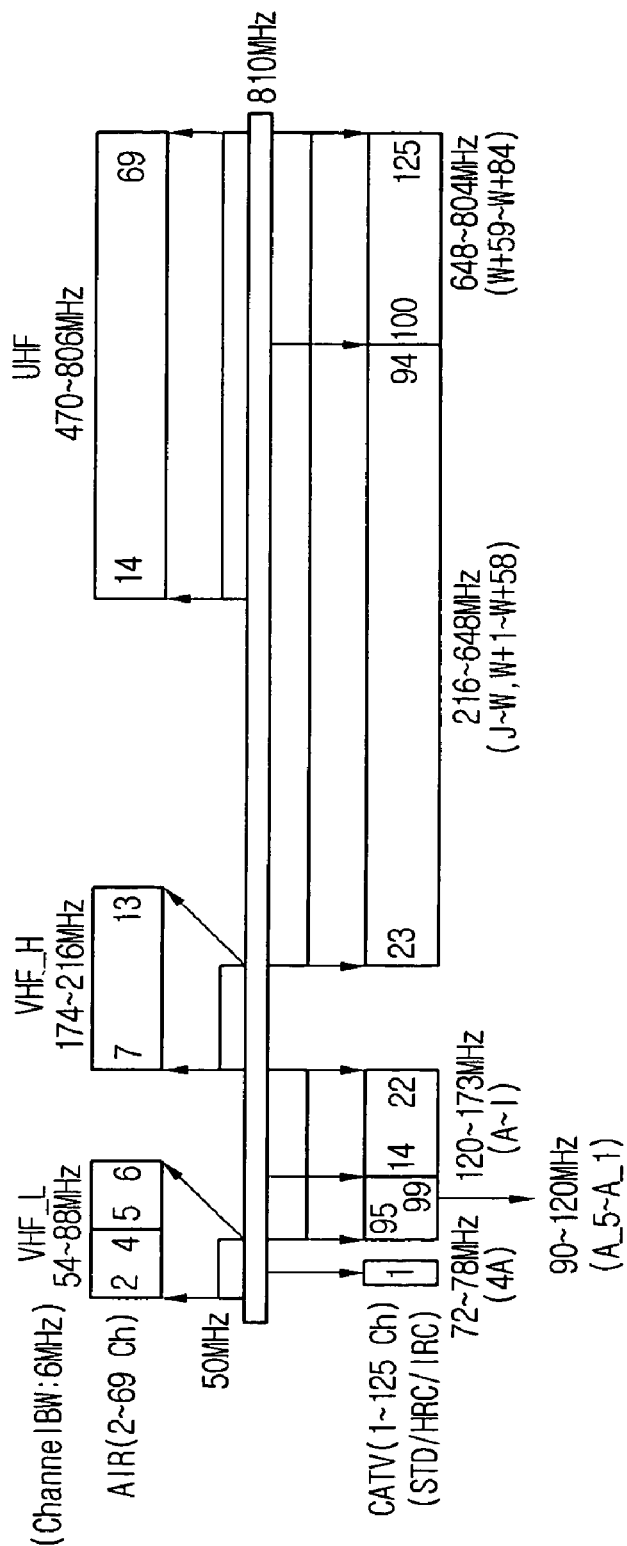
FIG. 1 illustrates frequencies of analog and digital broadcast channels.
Figure 2:
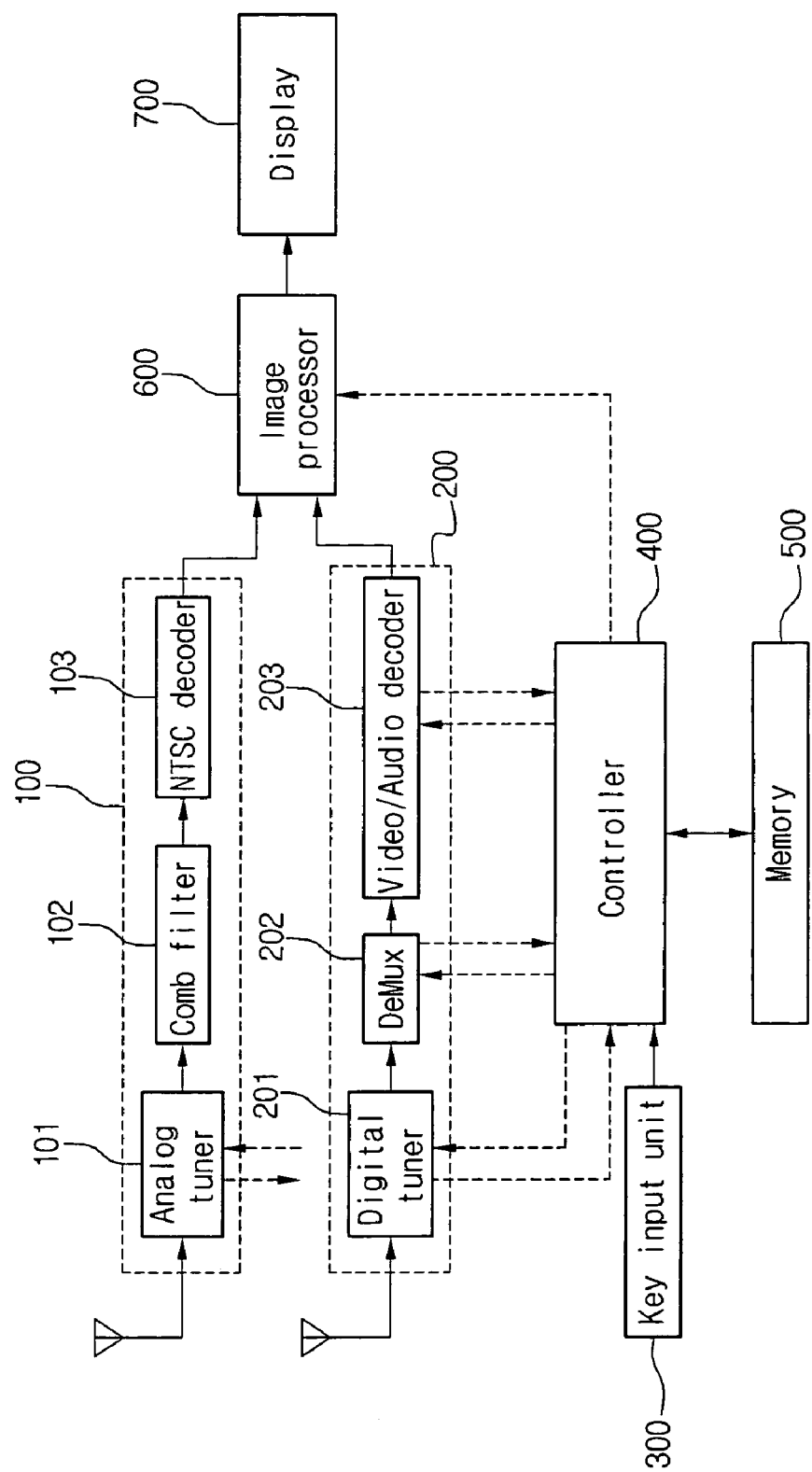
FIG. 2 is a schematic block diagram of a digital TV according to the present invention.
Figure 3:
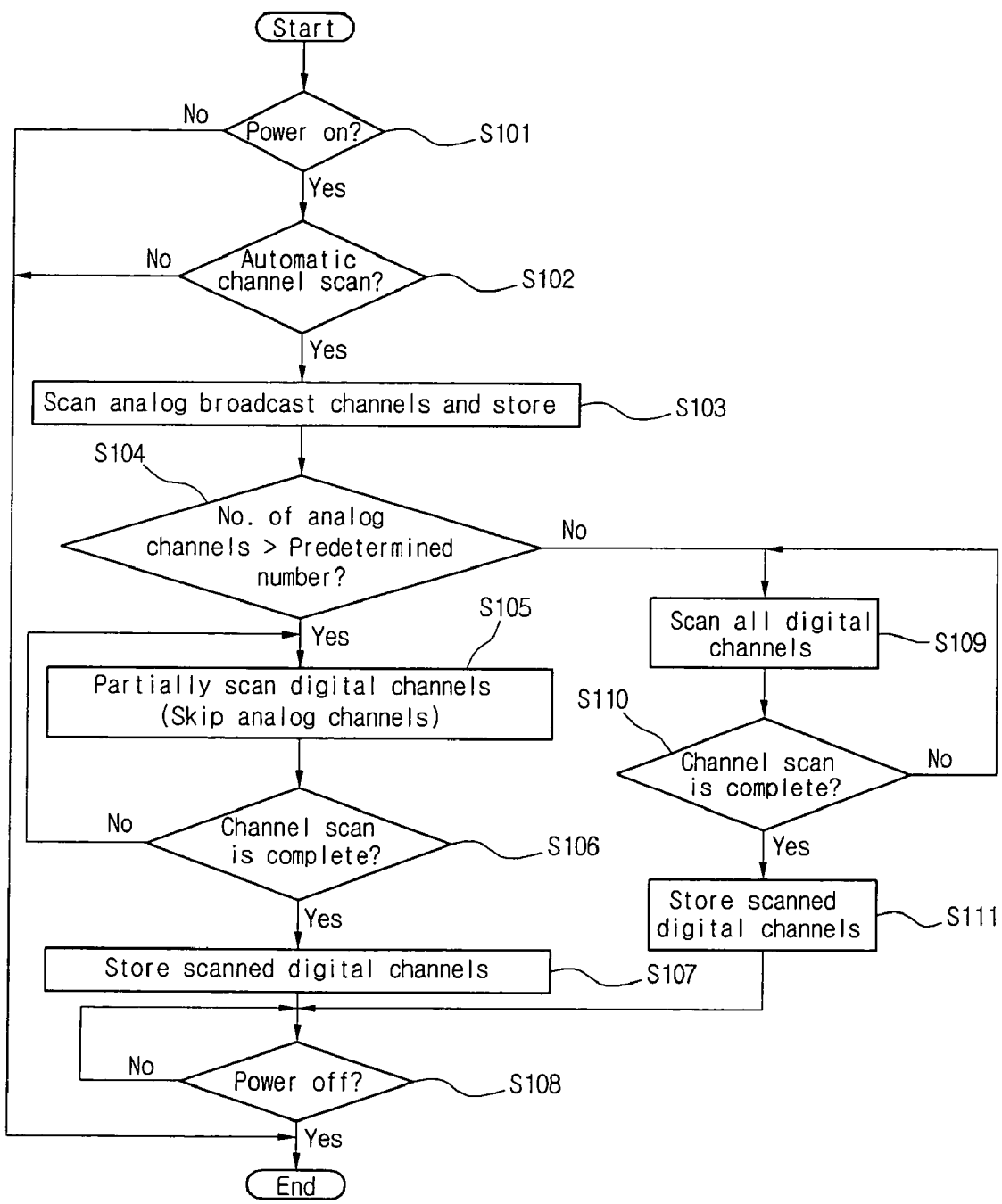
FIG. 3 is a flow chart describing a channel setting method of a digital TV according to the present invention.

FIG. 2 is a schematic block diagram of a digital TV according to the present invention; and FIG. 3 is a flow chart describing a channel setting method of the digital TV according to the present invention.

As shown in FIG. 2, the digital TV according to the present invention includes an analog signal processor 100 for receiving an analog broadcast signal and processing the analog broadcast signal to a displayable signal; a digital signal processor 200 for receiving a digital broadcast signal and processing the digital broadcast signal to a displayable signal; a key input unit 300 to which a user inputs a request (command); a controller 400 for outputting a control signal according to the user request inputted through the key input unit 300; an image processor 600, in response to the control signal of the controller 400, for receiving an image signal processed by the analog signal processor 100 or the digital signal processor 200 and processing the image signal displayable on a display 700; and a memory 500 for storing broadcast data of every channel.

The analog processor 100 includes an analog tuner for tuning an analog channel, and an NTSC decoder 103 for filtering through a comb filter 102 broadcast signals of the tuned channel by the analog tuner 101 and decoding the broadcast signals to NTSC signals.

The digital processor 200 includes a digital tuner 201 for roughly tuning an digital channel; a DeMux 202 for receiving broadcast signals of tuned digital channels by the digital tuner 201 and demultiplexing the broadcast signals into image, voice and additional information; and a video decoder 203 for receiving the demultiplexed image signal by the DeMux 202 and decoding it.

Therefore, when the user inputs a channel select command through the key input unit 300, the controller 400 outputs a control signal to a corresponding tuner for tuning into a corresponding channel.

If the user inputs an automatic channel scan command through the key input unit 300, the analog tuner 100 is tuned to analog channels and then, the digital tuner 200 is tuned to digital channels.

At this time, if the number of tuned analog channels is greater than a predetermined number of channels, a digital channel coexisting with the analog channel is skipped or not tuned by the digital tuner, but is tuned partially. In other words, the digital signal tuning process is skipped over the channels having analog broadcast signals.

To tune to the analog channel, the analog tuner 101 first scans synchronization with a corresponding frequency of a channel to be tuned, and decides whether the scanned synchronization is within the predetermined frequency range to decide if a channel signal exists.

On the other hand, a broadcast signal received through the digital tuner 201 is transmitted in form of an error-corrected digital stream by VSB sync or an MPEG-2 standard transport stream packet The error-corrected digital stream by the VSB sync is inputted to the DeMux 202. Then, the DeMux 202 finds a stream including PAT (Program Association Table) information, and transmits the data to the controller 400 to construct a PMT (Program Map Table). After the PAT is constructed, a VCT, table is scanned among the streams having 0*1FFB address to distinguish whether the stream currently inputted is a PSIP stream. Later, an EIT (Event Information Table) is constructed with a stream for constructing the EIT. And, by extracting the channel number of the VCT table, it is possible to find out the actual channel number of the current RF channel, i.e., a major-minor channel number.

Meanwhile, the MEPG-2 standard stream includes a header in front of the packet, and the header has PID (Packet Identifier) number. The PID number can be used as an information for demultiplexing a time-division multiplexed signal. Also, the PID number indicates which kind of packet is transmitted at present. Thus, by analyzing the PID number, it is possible to find out if the current packet is an image packet, voice packet, or program specific information. In short, the digital stream consists of the PAT including PID of the PMT, the PMT including PID number in the current RF channel digital stream, and the EIT including specific information of each program.

However, the digital stream consisting of the PAT/PMT does not have the major-minor channel number, but has only the number of programs within the digital stream and video/audio PID of each program. Thus, the major channel number uses the RF channel number where the digital stream is inputted, and the minor channel uses the PMT program number.

A channel setting method of the digital TV according to the present invention will now be described with reference to FIG. 3. As shown in FIG. 3, it is first decided whether the user inputs a power on command and an automatic channel scan command (S102-S102).

If the user inputted the automatic channel scan command, the analog channels are tuned and stored (S103).

Following the tuning, it is decided whether the number of stored analog channels is greater than a predetermined number of channels (S104).

If it turns out that the number of analog channels being scanned is greater than the predetermined number of channels, the digital channels are partially scanned (S105). Here, the partial scan of digital channels means that the digital channel scan is selectively performed, skipping the channels already being occupied by analog broadcasts.

And, it is decided whether the channel scan is complete (S106).

If the channel scan is complete, the scanned digital channels are stored (S107).

Later, if the user inputs a power off command, the procedure is ended (S108).

In step 104, however, if it turns out that the number of analog channels being scanned is less than the predetermined number of channels, it means that not many analog channels exist. Therefore, all digital channels are scanned (S109).

Then, it is decided whether the channel scan is complete (S110).

If the channel scan is complete, the scanned digital channels are stored (S111).

The reason for scanning all or part of the digital channels in dependence of the number of analog channels being scanned is because there is not much difference in the total channel scan time taken for scanning all of the digital channels especially when only a few analog channels exist.

Therefore, irrespective of the number of analog channels, the partial scan of digital channels can be performed on every channel except for the analog broadcast channels. In this case, the steps S104, S109, S110, and S111 in FIG. 3 can be omitted.

Figure 4:
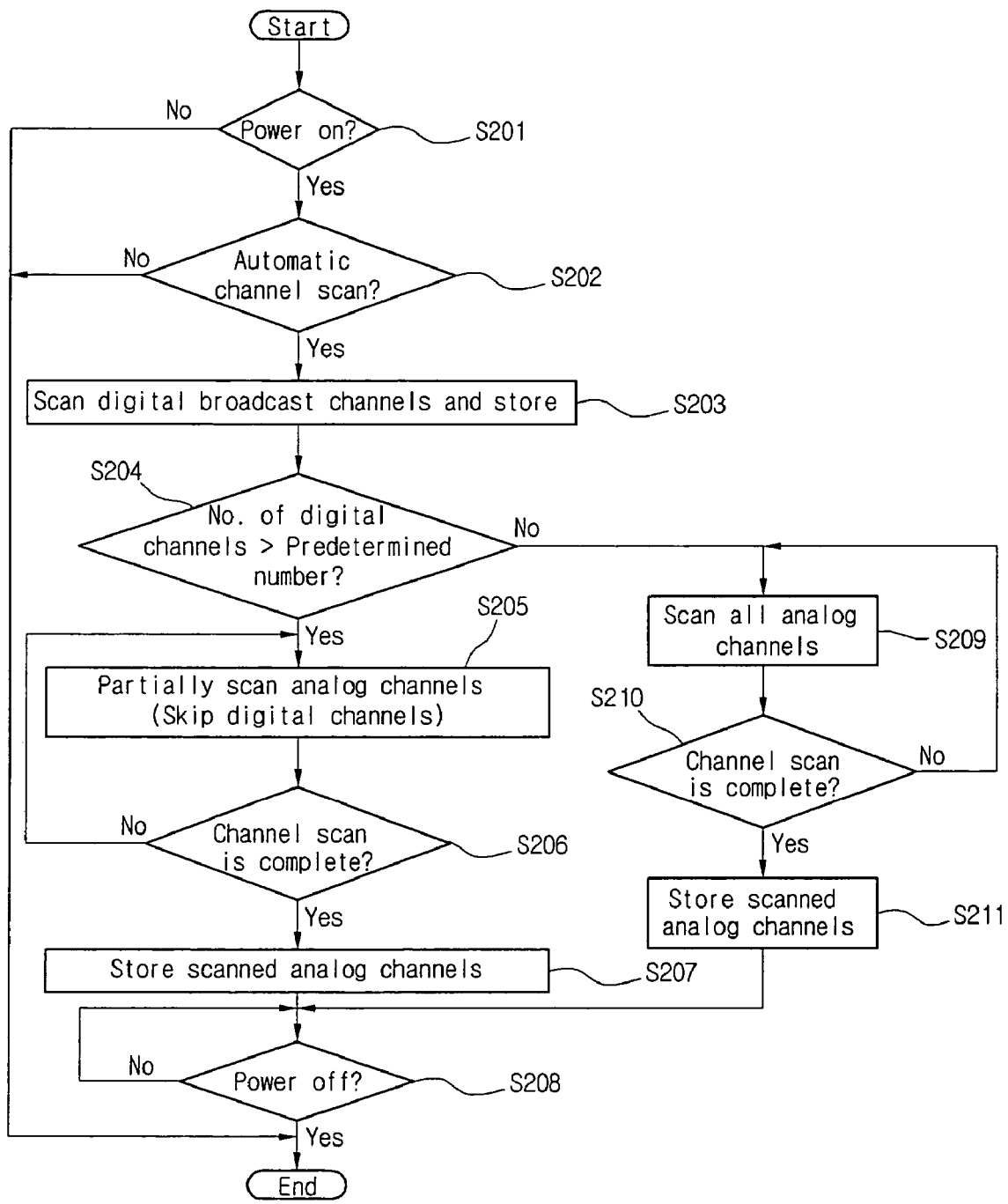
FIG. 4 is a flow chart describing a channel setting method of a digital TV according to another embodiment of the present invention.

FIG. 4 describes another embodiment of the channel setting method of the digital TV according to the present invention. Particularly, in this embodiment, digital channels are first scanned and then analog channels are scanned. But the effects of the method are the same with the one described in FIG. 3.

At first, it is decided whether the user inputs a power on command and an automatic channel scan command (S201-S202).

If the user inputted the automatic channel scan command, the digital channels are tuned and stored (S203).

Following the tuning, it is decided whether the number of stored digital channels is greater than a predetermined number of channels (S204).

If it turns out that the number of digital channels being scanned is greater than the predetermined number of channels, the analog channels are partially scanned (S205). Here, the partial scan of analog channels means that the analog channel scan is selectively performed, skipping the channels already being occupied by digital broadcasts.

And, it is decided whether the channel scan is complete (S206).

If the channel scan is complete, the scanned analog channels are stored (S207).

Later, if the user inputs a power off command, the procedure is ended (S208).

In step 204, however, if it turns out that the number of digital channels being scanned is less than the predetermined number of channels, it means that not many digital channels exist. Therefore, all analog channels are scanned (S209).

Then, it is decided whether the channel scan is complete (S210).

If the channel scan is complete, the scanned analog channels are stored (S211).

The reason for scanning all or part of the analog channels in dependence of the number of digital channels being scanned is because there is not much difference in the total channel scan time taken for scanning all of the analog channels especially when only a few digital channels exist.

Therefore, irrespective of the number of digital channels, the partial scan of analog channels can be performed on every channel except for the digital broadcast channels. In this case, the steps S204, S209, S210, and S211 in FIG. 4 can be omitted.

According to the above-described channel setting method of the digital TV of the present invention, when the user inputs the automatic channel scan command, the analog channels are first scanned and the digital channels next. At this time, if the number of the analog channels being scanned is greater than the predetermined number, it is decided whether the present digital channel is actually a pre-stored analog channel. If so, the tuning process skips the pre-stored analog channel and proceeds to the next channel.

In conclusion, the digital TV and its channel setting method of the present invention has several advantages as follows.

First, it is possible to reduce the automatic channel scan time by skipping the digital channel scan process on pre-stored analog channels.

Second, as the automatic channel scan time is reduced, the channel setting method of the present invention can be used more effectively in multi-channel broadcasting environment like closed circuit TVs or cable TVs.

Third, because of the reduced automatic channel sear time, the user satisfaction of the digital TV of the present invention is greatly improved.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An image display apparatus equipped with an analog tuner and a digital tuner, the apparatus comprising:
a key input unit for enabling a user to input an automatic channel scan command and other requests;
a controller for conducting a channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein the channel scan is skipped on pre-stored channels and only the rest of channels are subject to the scan when the number of channels scanned first and stored is greater than a predetermined number; and
a memory for storing analog channels/digital channels being automatically scanned.

2. The image display apparatus equipped with an analog tuner and a digital tuner according to claim 1, wherein to tune the analog channel, the analog tuner first scans synchronization with a corresponding frequency of a channel to be tuned, and decides whether the scanned synchronization is within the predetermined frequency range to decide if a channel signal exists.

3. The image display apparatus equipped with an analog tuner and a digital tuner according to claim 1, wherein to tune the digital channels, the digital tuner extracts the channel number of a VCT table.

4. The image display apparatus equipped with an analog tuner and a digital tuner according to claim 1, to tune the digital channels, the digital tuner uses the RF channel number where the digital stream is inputted, and a PMT program number.

5. An image display apparatus equipped with an analog tuner and a digital tuner, the apparatus comprising:
a key input unit for enabling a user to input an automatic channel scan command and other requests;
a controller for conducting a channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein a comparison of the number of channels scanned first with a predetermined number of channels determines whether the channel scan is partially or fully conducted for channels to be scanned next; and
a memory for storing analog channels/digital channels being automatically scanned.

6. An image display apparatus equipped with an analog tuner and a digital tuner, the apparatus comprising:
a key input unit for enabling a user to input an automatic channel scan command and other requests;
a controller for conducting a channel scan in response to the automatic channel scan command inputted through the key input unit, the channel scan first being conducted on analog channels and then digital channels by using the analog tuner and the digital tuner, or first being conducted on digital channels and then analog channels by using the digital tuner and the analog tuner, wherein a comparison of the number of channels scanned first with a predetermined number of channels determines a channel scan method; and
a memory for storing analog channels/digital channels being automatically scanned,
wherein if the number of channels scanned first and stored is greater than the predetermined number of channels, the channel scan is partially conducted for channels to be scanned next; while if the number of channels scanned first and stored is less than the predetermined number of channels, all channels are subject to the channel scan.

7. The image display apparatus equipped with an analog tuner and a digital tuner according to claim 5, wherein to tune the analog channel, the analog tuner first scans synchronization with a corresponding frequency of a channel to be tuned, and decides whether the scanned synchronization is within the predetermined frequency range to decide if a channel signal exists.

8. The image display apparatus equipped with an analog tuner and a digital tuner according to claim 5, wherein to tune the digital channels, the digital tuner extracts the channel number of a VCT table.

9. The image display apparatus equipped with an analog tuner and a digital tuner according to claim 5, to tune the digital channels, the digital tuner uses the RF channel number where the digital stream is inputted, and a PMT program number.

10. A channel setting method of a digital TV equipped with an analog tuner and a digital tuner, the method comprising the steps of:
if a user inputs an automatic channel scan command through a key input unit, scanning analog channels or digital channels first and storing the scanned channels; and
when the number of channels scanned first and stored is greater than a predetermined number, skipping a channel scan on the analog or digital channels already being scanned and stored, and continuing the channel scan for the rest of channels.

11. A channel setting method of a digital TV equipped with an analog tuner and a digital tuner, the method comprising the steps of:
if a user inputs an automatic channel scan command through a key input unit, scanning analog channels or digital channels and storing the scanned channels;
determining whether the channel scan is partially or fully conducted for channels to be scanned next based on a comparison result of the number of channels scanned first with a predetermined number of channels; and
scanning part of or all analog or digital channels, depending on which channels are first scanned, and storing the scanned channels.

12. The method according to claim 11, wherein the partial scan of analog channel is selectively performed, skipping the channels already being occupied by digital broadcasts.

13. The method according to claim 11, wherein the partial scan of digital channel is selectively performed, skipping the channels already being occupied by analog broadcasts.

14. A channel setting method of a digital TV equipped with an analog tuner and a digital tuner, the method comprising the steps of:

if a user inputs an automatic channel scan command through a key input unit, scanning analog channels or digital channels and storing the scanned channels;

determining a channel scan method based on a comparison result of the number of channels scanned first with a predetermined number of channels; and scanning part of or all analog or digital channels, depending on which channels are first scanned, and storing the scanned channels, wherein if the number of channels scanned first is greater than the predetermined number of channels, part of the channels are scanned; while if the number of channels scanned first is less than the predetermined number of channels, all of the channels are scanned.

* * * * *